United States Patent [19]
Adams

[11] 3,815,200
[45] June 11, 1974

[54] METHOD OF MAKING MOLD

[75] Inventor: Leslie R. Adams, Lansing, Mich.

[73] Assignee: Motor Wheel Corporation, Lansing, Mich.

[22] Filed: June 29, 1973

[21] Appl. No.: 374,884

Related U.S. Application Data

[60] Division of Ser. No. 189,116, Oct. 14, 1971, Pat. No. 3,762,677, which is a continuation-in-part of Ser. No. 857,960, Sept. 15, 1969, abandoned.

[52] U.S. Cl. ............... 29/159 A, 29/159 R, 264/45
[51] Int. Cl. ........................................... B21d 53/26
[58] Field of Search .......... 29/159 R, 159 A, 159.1; 301/37 P, 37 R, 63 R; 249/56, 57, 105; 264/45, 338; 260/31.2 N; 293/71 R

[56] References Cited
UNITED STATES PATENTS

| | | | |
|---|---|---|---|
| 2,148,995 | 2/1939 | Nelson | 301/37 P |
| 2,895,175 | 7/1959 | Reuter et al. | 264/277 X |
| 3,193,884 | 7/1965 | Haynie et al. | 249/57 X |

*Primary Examiner*—Charles W. Lanham
*Assistant Examiner*—Victor A. DiPalma
*Attorney, Agent, or Firm*—Barnes, Kisselle, Raisch & Choate

[57] ABSTRACT

Apparatus for molding a composite styled wheel for use on automotive passenger vehicles and the like, a method of constructing such a wheel employing the molding apparatus and a method of constructing such molding apparatus, wherein a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density noncellular elastomer body which permanently adheres to the outboard surface of the wheel subassembly. The plastic overlay may also be constructed from a lower density microcellular closed cell urethane elastomer adhesive material. The urethane material is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

5 Claims, 11 Drawing Figures

METHOD OF MAKING MOLD

This application is a division of my copending application Ser. No. 189,116, now U.S. Pat. No. 3,762,677, filed Oct. 14, 1971, which in turn is a continuation-in-part of my earlier filed application Ser. No. 857,960, filed Sept. 15, 1969, now abandoned.

This invention relates to molding apparatus and methods for constructing a composite metal-elastomer automotive-type vehicle wheel construction with a three-dimensional deeply contoured ornamental outer face.

Automotive passenger vehicle wheels with three-dimensional deeply contoured ornamental discs or bodies are usually produced by deep drawing a flat steel plate. These draws are usually so deep that the wheel disc must be formed in several stages or press operations and it is sometimes necessary to anneal a disc between some of the drawing stages. Such severe drawing operations are also accompanied by relatively short die and tooling life. For these reasons, the deep drawing of ornamental wheel discs is a relatively expensive way of producing ornamental wheels.

Objects of this invention are to provide improved molding apparatus for making a composite metal and plastic ornamentally styled vehicle wheel, and an improved method of constructing such apparatus as well as the wheel, which are economical, readily adaptable to continuous mass production line techniques, allow recycling of a portion of the molding apparatus in a production line process, insure good adhesion and accurate location of the plastic portion relative to the metal portion of the wheel, provide improved mold cavity sealing and a minimum of flash, reduce the cost of metal draw forming equipment required to construct the composite wheel and enable wheel constructions to be produced with ornamental configurations not achievable by deep drawing the metal portion of the wheel.

It is also an object of the present invention to provide improved apparatus and method which economically enable the construction of a new and improved ornamental wheel with side impact cushioning to prevent damage to the wheel, provide a comparatively inexpensive wheel with deep three-dimensional ornamental contours in the outboard face of the wheel, and provide such a wheel while retaining the high strength and impact resistance advantages of the time-proven conventional ductile steel wheel components. The composite metal and plastic styled wheel constructed by the apparatus and method disclosed and claimed herein is claimed in a copending divisional application Ser. No. 189,395, filed Oct. 14, 1971, based on my aforesaid copending parent application Ser. No. 857,960 now U.S. Pat. No. 3,756,658, filed Sept. 15, 1969.

These and other objects, features and advantages of this invention are disclosed in more detail in the accompanying detailed description and drawings in which.

Figure 1:
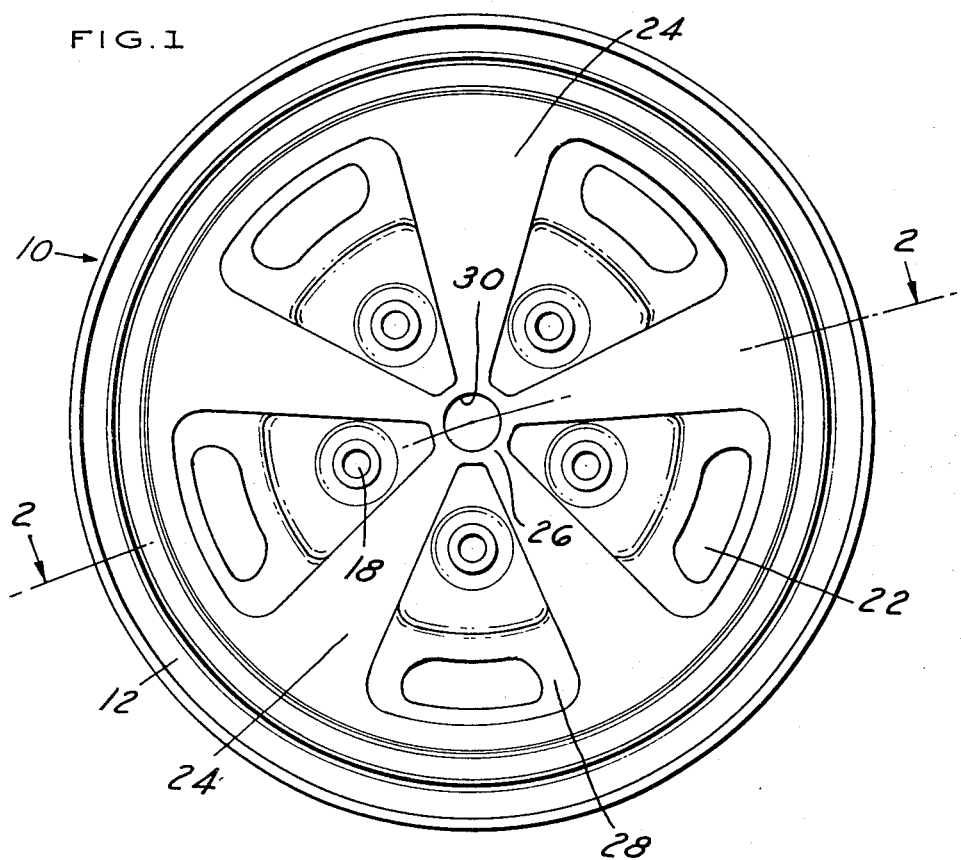
FIG. 1 is a plan view illustrating a wheel constructed with the apparatus and by the methods of this invention so as to have a three-dimensional contoured ornamental outboard face.
Figure 3:
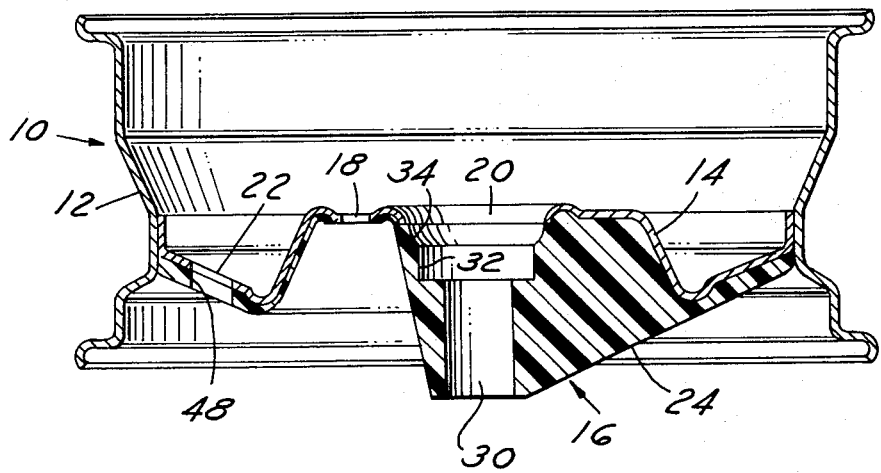
FIG. 3 is a cross-sectional view on line 2—2 of FIG. 1 of the wheel body of FIG. 2 illustrating the overlay adhering to the wheel body after it has been removed from the mold.

Referring in detail to the drawings:

FIGS. 1 and 3 illustrate an ornamental wheel constructed with the apparatus and by the methods of this invention. The wheel is designated generally as 10 and comprises by way of a preferred example a conventional drop center steel rim 12, a central disc or body 14 and an ornamental three-dimensional contoured overlay designated generally at 16 secured to disc 14. Disc 14 is provided with a circle of bolt holes 18 and a central aperture 20 so that wheel 10 can be removably attached to a wheel spindle and disc or drum brake assembly. For decorative purposes and also for brake ventilation a plurality of cutouts 22 are provided in disc 14. The particular configuration of the steel components of the wheel, including rim 12 and disc 14, may follow solely utilitarian considerations such as strength of the wheel and ease and economy of manufacture, since the aesthetic appearance of the wheel is determined largely by the three-dimensional contour of ornamental overlay 16. For example, in some applications disc 14 can be a generally flat steel plate or it can have a simple smooth saucer contour.

The three-dimensional contours of overlay 16 are determined by the particular ornamental or aesthetic appearance desired by the designer of wheel 10. In the ornamental design of FIG. 1, overlay 16 is provided with heavy outwardly flaring spoke sections 24 which extend radially between the junction of rim 12 and disc 14 and the central hub portion 26. Spokes 24 also extend axially or laterally outwardly away from disc 14 so that they form a segmented generally conical surface as best seen in FIG. 3. Generally triangular-shaped portions 28, each of which overlie a cutout 22 and a bolt hole 18, are recessed from the conical surface to emphasize the spoke design and to provide access to bolt holes 18 to facilitate securing wheel 10 to a drum or disc brake and spindle assembly. To provide clearance for a spindle and the bearing mounting of a brake drum, an aperture 30, counterbore 32 and bevel 34 are provided through the central portion 26 of overlay 16.

Figure 2:
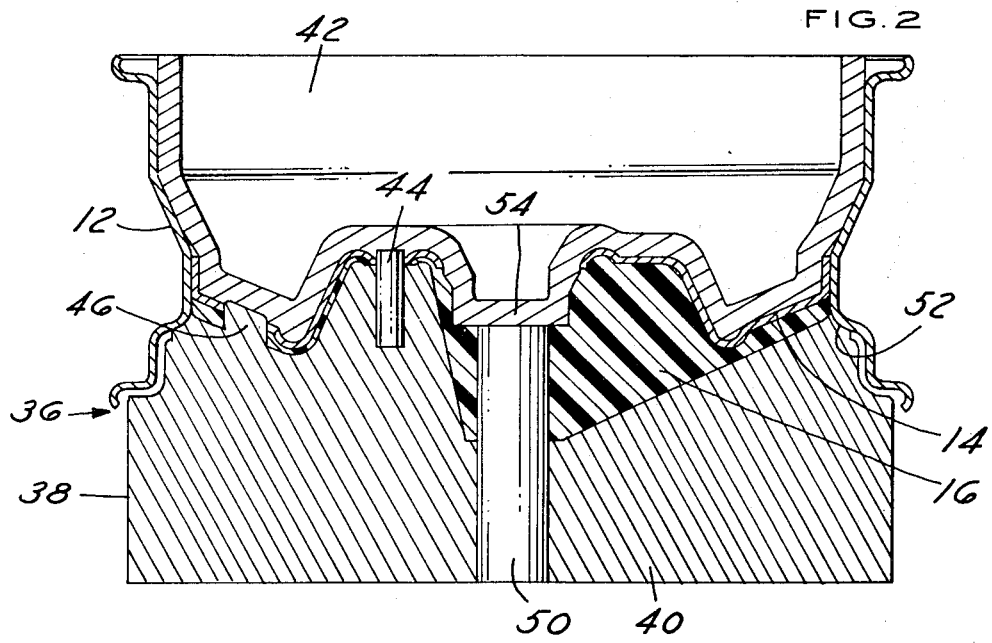
FIG. 2 is a cross-sectional view of one embodiment of a mold of the present invention for forming a three-dimensional ornamental elastomer overlay as an integral part of the wheel and illustrates in cross section on line 2—2 of FIG. 1 the wheel body positioned in the closed mold.

Preferably the three dimensional contour of overlay 16 is formed by, and the overlay is adhered to a portion or all of disc 14 and a portion or all of rim 12, by suitable molding process or method described in more detail hereinafter. A suitable mold, designated generally as 36, for making overlay 16 from a urethane elastomer is illustrated in FIG. 2. Mold 36 has a lower half or bottom 38 with a cavity 40 which is shaped to provide the three dimensional contour of overlay 16. Mold 36 also comprises an upper half 42 which is shaped so that it will engage with the inner surface of disc 14 and rim 12 to provide a backup clamp or support for wheel 10 when it is placed in mold 36. A plurality of pins 44 are provided in the lower mold half 38 for registry with bolt holes 18 to positively locate the wheel circumferentially in mold 36. A plurality of bosses 46 protrude from mold bottom 38 into die cavity 40 and serve to positively locate the wheel circumferentially by engaging in disc cutouts 22 and also provide a core so that similar cutouts 48 (FIG. 3) will be formed in overlay 16 when it is cast in the mold. A cylindrical core 50 is provided in mold cavity 40 to form central aperture 30 in overlay 16 when it is cast in mold 36. Lower mold half 38 is provided with an annular lip 52 adjacent to the outer edge of cavity 40 on which wheel rim 12 is seated with a close fit to provide a seal between the cavity and rim 12 of the wheel so that when overlay 16 is formed the casting material will not be forced out of or leak from mold 36. A central portion 54 of upper mold half 52 extends below disc 14 and cooperates with central core 50 to provide a positive stop which limits the closure of mold 36. Central portion 54 also provides a core in cavity 40 to form counterbore 32 and bevel 34 of overlay 16.

Suitable plastic materials for molding or csting overlay 16 are synthetic rubber materials generally but preferably high density, non-cellular urethane elastomers and micro-cellular urethane elastomers such as those sold by The Goodyear Tire & Rubber Company. These urethane elastomers form a high density "solid rubber'- 'to type overlay having a density on the order of 50 to 55 lbs. per cubic foot which provides a resilient protective padding well adapted to cushion side impacts and thereby reduce or prevent damage to the structural steel components of the wheel. This urethane elastomer has the ability to chemically bond to a clean metal surface, thereby eliminating the necessity of securing the overlay to the wheel disc by some additional adhesive material. While the urethane will adhere to a clean metal surface, it is preferred to bonderize or provide a phosphate coating on disc 14 before the wheel is placed in mold 36 to provide improved adhesion of overlay 16 to the wheel body. The urethane elastomer when cast against a mirror finish mold surface also provides a very smooth, shiny and impervious surface which may be painted or otherwise covered with a decorative coating and when so covered will appear to be an integral metallic portion of the steel wheel. Due to the high density of this urethane elastomer and its non-cellular or closed cell micro-cellular structure, it will not absorb moisture. This is particularly advantageous if the wheel and overlay are not painted or otherwise covered immediately after the overlay is molded or if the paint becomes chipped or its integrity is in some other way destroyed.

If the wheel and overlay are to be painted, it is preferable to use a urethane paint because it has a high gloss and tensile strength and can stretch and contract with movement of the underlay without cracking. One example of a color stable coating or paint for covering the polyurethane casting 16 is disclosed in United States patent application of Anthony F. Finelli and James C. West, Ser. No. 467,115, filed June 25, 1965 and assigned to The Goodyear Tire & Rubber Company, parent company of assignee herein. Further disclosures pertaining to the making of paints useful for applying a coating over casting 16 will be found in U.S. Pat. Nos. 3,267,078 and 3,420,800.

Mold 36 is usually formed from either metal or epoxy resin reinforced with fiber glass. If mold 36 is made from metal, preferably mold cavity 40 will be nickel plated and polished to provide a very smooth mirror surface so that when the molded overlay is painted or covered with some other finish it will have a shiny or high gloss metallic appearance. A flexible mold liner can also be used with the above construction.

Figure 4:
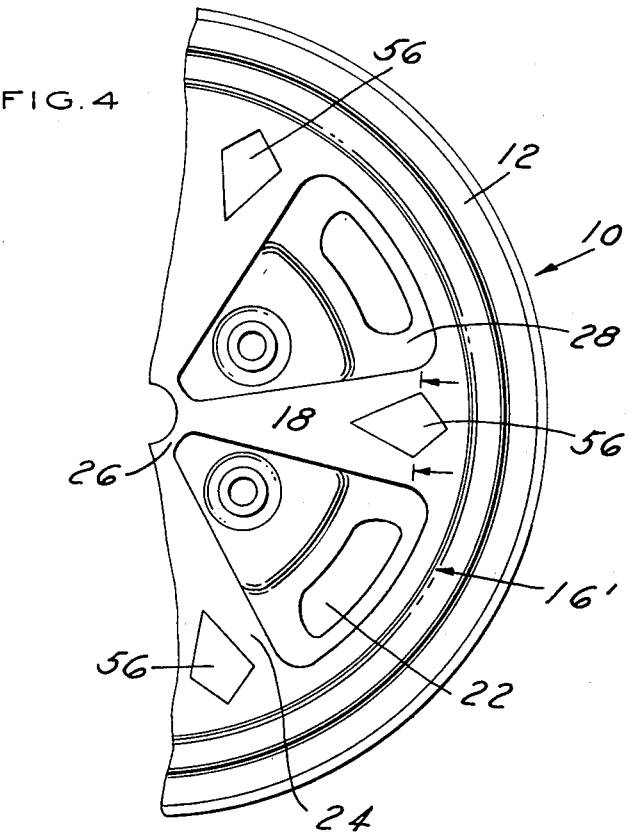
FIG. 4 is a fragmentary plan view of a wheel constructed pursuant to this invention illustrating a decorative trim panel inserted in the outboard face of the overlay of the wheel.
Figure 5:
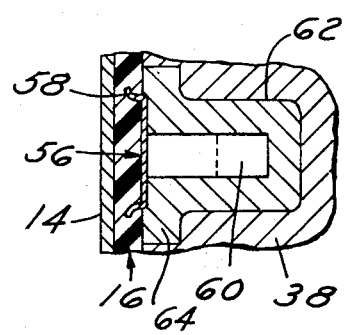
FIG. 5 is a fragmentary sectional view of the lower half of a mold of the present invention illustrating a way of positioning the decorative trim panel in the mold in accordance with the present invention.

Trim panels can also be inserted or attached to the overlays to provide an additional ornamental or decorative effect. FIG. 4 illustrates a diamond-shaped trim panel 56 mounted in the outboard face of each spoke portion 24 of overlay 16. Trim panel 56 can be a polished or plated metal insert such as a polished stainless or chrome plated steel insert and a real or simulated wood veneer secured to a metal backing plate or a transparent or translucent vinyl trim piece with a vacuum metalized inner surface. As shown in FIG. 5, trim plates 56 are formed with tabs or ears 58 which extend inwardly into the mold cavity to become embedded in the cast elastomer materal to assure that trim plate 56 is mechanically secured or attached to overlay 16.

Trim panel 56 can be readily secured to overlay 16 by first positioning the trim panel in the lower half 36 of mold 38 and then casting the urethane elastomer in the mold so that tabs 58 of trim panel 56 become surrounded by and embedded in urethane elastomer when overlay 16 is formed. Trim panel 56 must be securely held in the mold so that it will not be shifted or knocked out of position when the urethane elastomer is injected into the mold. It must also be released or releasable from the mold after overlay 16 is formed so that the trim panel can be removed from the mold with the overlay. FIG. 5 illustrates one means for positioning trim piece 56 in lower mold half 38. A permanent magnet 60 is mounted in a flexible liner 64 of a mold pocket 62 in lower mold half 38. Liner 64 seals trim panel 56 in the molding operation and compensates for normal manufacturing variations in the thickness and configuration of trim panel 56.

The wheel with three dimensional ornamental contour is made by opening mold 36 and coating the surface of core 50 and the surface 40 of the lower mold half 38 with a parting or mold release compound such as Dow Corning 203 Fluid, Chem Trend P5C1, a polyethylene dispersion in water or a suitable low boiling solvent such as hexane or the naphthas to prevent the urethane material from sticking to the surface 40 of the cavity. If a trim piece 56 is utilized it is inserted into cavity 40 and held in place by magnet 60. The urethane material in liquid form is poured into the mold cavity from a mixing head of a conventional polyurethane mixing machine which meters and mixes the two-part (or more) reactive components to supply the appropriate amounts of resin and catalyst. The wheel body 14 is immediately positioned over locating pins 40 and bosses 46 on the lower mold half 38, and then the upper mold half or lid 42 is closed to engage the upper side of wheel body 14 and rim 12. This seals the mold cavity to the wheel at lip 52 and reinforces the wheel body against pressure due to an excess of, or expansion of, the urethane material. The urethane material is partially or completely cured in the mold which causes overlay 16 to mechanically and chemically adhere to disc 14 of the wheel. The mold is then opened and the wheel with the integral three dimensionally contoured ornamental overlay 16 cast thereagainst is removed from the mold. The mold is usually maintained at an elevated temperature between room temperature and 200° F., (the upper half or so of this range, say from about 150° F. and above, being preferred for the polyurethane reaction materials specified hereinafter,) and the wheel body can be preheated prior to being placed in the lower half of the mold to reduce the time required to cure the urethane material. The particular temperature of the mold and the use of a preheated wheel will depend upon the curing characteristics of the particular urethane material that is used to form the overlay. If it is desired to further mechanize the molding operation the urethane material in liquid form can be injected into the mold cavity after it has been closed (as set forth in FIG. 6) rather than being metered into the cavity before the wheel is placed on the lower half of the mold. Also, suitable holes may be provided in the disc or rim of the wheel in non-critical locations to facilitate injection of urethane material and/or to help vent the mold cavity.

Preferably, in accordance with the present invention, an isocyanate base elastomer material is provided and caused to cure without blowing in the mold cavity. Elastomeric non-blowing materials which are particularly useful for the purpose of the present invention are the polyurethane materials having varying but relatively high densities. These rubber-like materials may be formed by reacting a wide variety of polymeric materials, such as polyester, polyol polyesteramides, polyalkylene glycol or polyols, castor oil and other materials having a plurality of reactive hydrogen groups, usually two to three but also four or more, with organic polyisocyanates in the presence of accelerators and/or cross linking agents and/or other additional agents such as plasticizers for modifying the characteristics of the end product urethane material. The formation of non-blowing polyurethane plastics involves a series of complex, physical and chemical reactions in which the evolution of carbon dioxide gas resulting from a reaction of carboxyl and isocyanate groups and/or between water and isocyanate groups is prevented to insure the end product has a non-blowing or non-cellular character, as is well understood in the art.

Examples of suitable polymeric materials which may be used in the production of suitable urethane elastomers for use in the present invention are polyesters and polyesteramides such as may be obtained by condensing a variety of polybasic acids, preferably dibasic acids such as adipic, sebacic, phthalic, oxalic, malonic, succinic, maleic, funmaric, itaconic, etc., with polyalcohols such as ethylene glycol, diethylene glycol, glycerol, surbitol and/or amino alcohols such as ethanolamine and amino propanol. Alkylene glycols and polyoxyalkylene glycols which may be used include ethylene glycol, propylene glycol, styrene glycol, diethylene glycol and polypropylene glycol and copolymers of these glycols. A high grade castor oil may also be used. Polyols having 3 or 4 hydroxyls or higher can be used, so long as the resulting polyurethane is not so brittle as to break upon impact, such as occurs when curbing a tire.

Examples of suitable organic polyisocyanates which may be used include the aliphatic, cyclo-aliphatic, and aromatic isocyanates such as toluene 2,4 diisocyanate, toluene 2,6 diisocyanate and mixtures thereof, naphthalene 1,5 diisocyanate and m-phenylene diisocyanate, etc., and mixtures of these materials, and methylene bis-(phenylene isocyanate) cyclohexylene diisocyanate, PAPI, a polyaryl polymethane polyisocyanate.

Examples of components which may be used for promoting the polyaddition reaction between the above-mentioned polymeric materials having free hydrogen reactive groups and organic polyisocyanates, and providing essential acceleration of the reaction include ethyl ethanolamine, diethyl ethanolamine, pyridine, hexahydro dimethylaniline, methyl piperazine, dimethyl piperazine, tribenzyl amine, N-morpholine, N-methyl morpholine, and N-ethyl morpholine. The relative hardness of the polyurethane elastomer can be varied by a suitable selection in suitable proportion of the initial urethane forming ingredients.

Cross linkers to cure the liquid reaction mixture whether made by the one shot, prepolymer or quasipolymer method are represented by the lower polyols such as those used to prepare polyesters and the aromatic, aliphatic and cyclo-aliphatic polyamines and preferably the primary organic diamines. Representative examples of the diamines are methylene dichloroaniline (MOCA), ortho dichlorobenzidine, phenylenediamine, menthane diamine, and cyclo hexylene diamines.

Specific examples of particular urethane materials and the molding die temperatures and curing time, presented by way of illustration of the method and product of this invention and not by way of limitation, are as follows:

EXAMPLE 1

A polyurethane prepolymer was prepared by mixing 113 parts of about a two to three thousand molecular weight polypropylene ether triol having acrylonitrile grafted thereto with a one-tenth part of a commercial triethylene diamine and two-tenths part dibutyltin dilaurate. Then this mixture was reacted at a reactive index of 103 with 88 parts of a toluene diisocyanate adduct of the above polypropylene ether triol having 30 percent free isocyanate groups. Then this prepolymer was mixed with a liquid commercial methylene bis orthochloroaniline to give about 10 percent free isocyanate on the liquid polyurethane reaction mixture basis. This liquid polyurethane reaction mixture was then poured into the mold cavity of the mold of FIG. 2 to form the cast polyurethane portion of the ornamental and decorative overlay on said wheel and then placed in an air oven at about 180° to 200° F. for five to ten minutes prior to removing the mold to obtain the metal wheel having the decorative overlay adhered thereto. Then this polyurethane decorative overlay was given a spray coat of a commercial polyurethane paint having suspended therein aluminum metallic flecks to give the wheel the appearance of an aluminum casting.

EXAMPLE 2

A second liquid polyurethane reaction mixture suitable for making the decorative overlay for the metal wheel was prepared by mixing 18.5 parts of a polypropylene ether triol of 4,600 molecular weight with 31.5 parts toluene diisocyanate to form a prepolymer containing 28 percent free NCO. Then 25 parts of this prepolymer was mixed with 0.29 parts of triethylene diamine and 0.23 parts dibutyltin dialaurate and then this was mixed with 6.25 parts of a liquid aromatic diamine available under the trade name du Pont LD813 and commonly referred to as partly liquid MOCA.

EXAMPLE 3

In a modification of Example 2, the polypropylene ether triol, 18.5 parts, was reacted with 31.5 parts of toluene diisocyanate to form a prepolymer adduct containing 28 percent free NCO. Then this adduct was reacted at a 106 index with a mixture of 25 parts polypropylene triol, 6.25 parts of MOCA containing about three-tenths of a part respectively of triethylene diamine and stannous octoate to form a liquid polyurethane reaction mixture.

Figure 6:
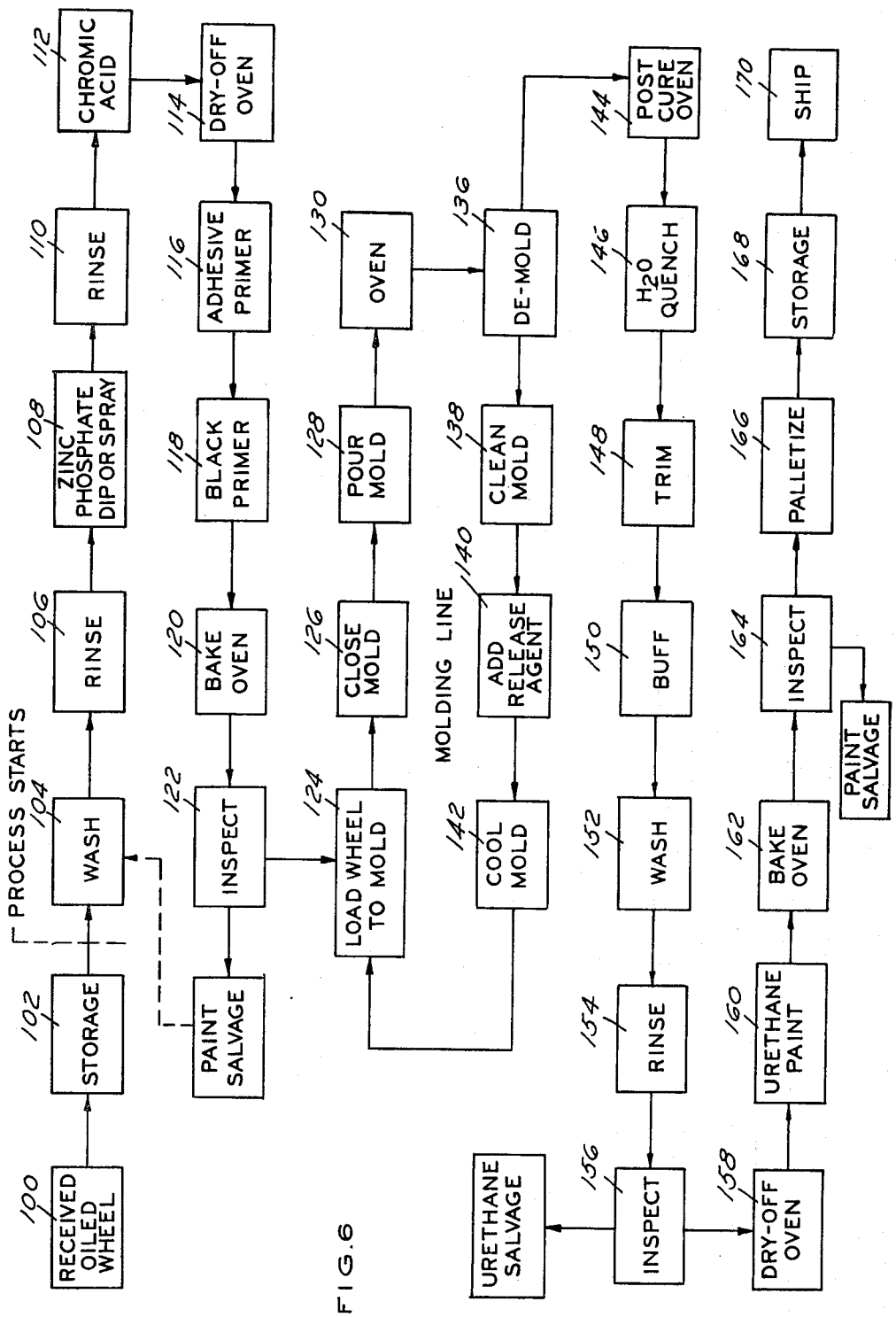
FIG. 6 is a block flow diagram illustrating in schematic form the sequence of steps involved in manufacturing a wheel pursuant to this invention, starting at the point where a unitary subassembly consisting of a steel rim and disc are received from a conventional wheel manufacturing facility, with the surfaces of the wheel oil coated.
Figure 7:
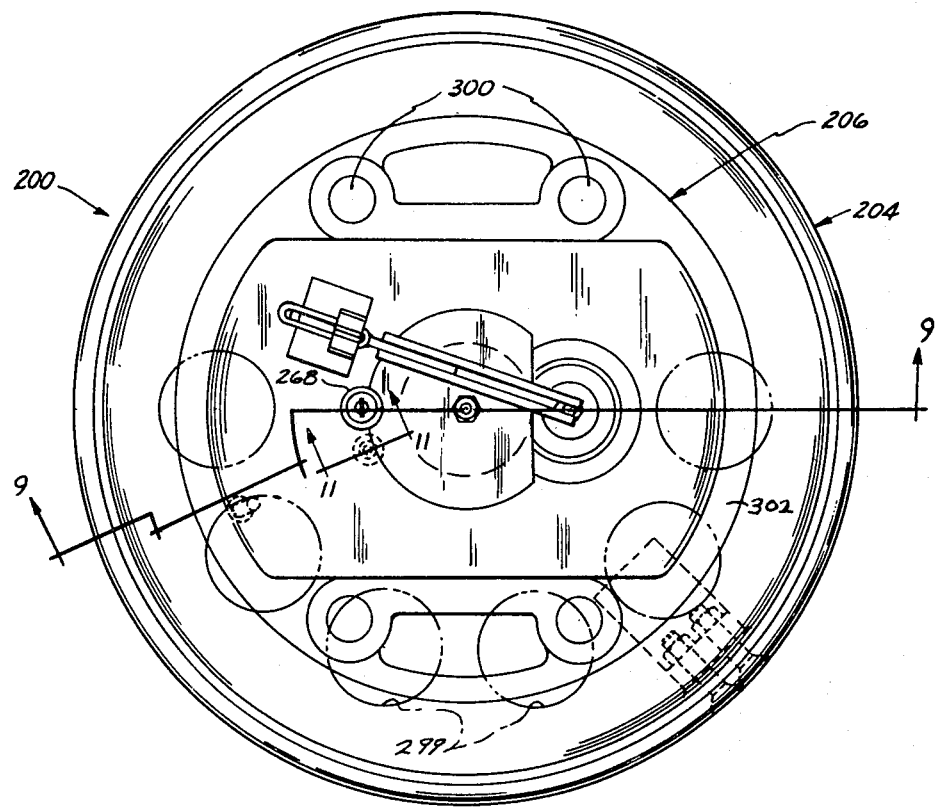
FIG. 7 is a top plan view of another embodiment of mold apparatus of the present invention for making a three-dimensional ornamental elastomer overlay as an integral part of the wheel.
Figure 8:
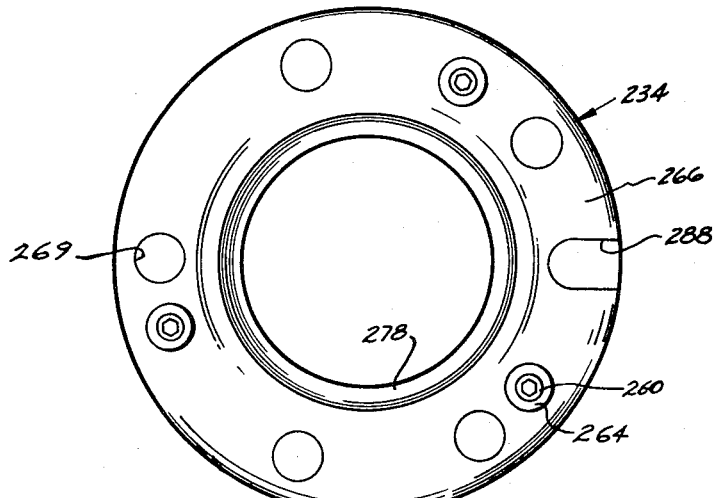
FIG. 8 is a top plan view of an annular inner seal employed in the mold apparatus of the embodiment illustrated in FIGS. 7–11.

Referring in more detail to FIG. 6, a production flow chart is illustrated for practicing the preferred and previously described cast-in-place embodiment of the method, with labelling added which in conjunction with the previous description will be readily understood by one skilled in the art. However, by way of further explanation, it should be understood that block 100 represents the unitary subassembly of rim 12 and disc 14 as received from a conventional wheel manufacturing facility. If the process is performed directly following the manufacture of the steel rim and disc subassembly, it is possible to eliminate the initial steps of oiling the wheel or otherwise coating it to prevent corrosion during storage. The steps up through block 122 all deal with treatment of this steel rim and disc subassembly prior to loading the same on the bottom 38 of mold 36 in the step represented by block 124. The steps set forth in block 104-114 inclusive represent a conventional zinc phosphate coating process. The "De-Mold" step of block 136 corresponds to the previously described step of opening mold 36 and removing the composite wheel consisting of the decorative overlay 16 molded to the disc 14 of the wheel 10. This part is then transferred to the post-cure oven indicated in block 144 and then subjected to a series of steps and routing as set forth in the blocks 146-170 downstream of block 144.

Although the urethane material poured or injected into the mold cavity in the step represented by block 128 can adhere by itself to a clean steel or zinc phosphated surface of disc 14, or to a coating of paint such as the usual black enamel primer paint which is customarily applied by the wheel manufacturer to the steel wheel rim and/or disc, it is preferred to precoat the outboard face of disc 14 (or whatever surface of the wheel is to be covered by the overlay 16) with a suitable adhesive compatible with the urethane material, and to cover the remaining surfaces of the wheel with the usual primer paint, followed by treatment in a bake oven to dry the paint and to help cure the adhesive prior to loading the wheel and disc subassembly into mold 36, these steps being indicated by blocks 116, 118 and 120 in FIG. 6. A conventional metal (steel)-to-urethane epoxy adhesive, such as that sold commercially under the trademark CONAP 1146-C, can be used in step 116 which adheres very securely to the zinc phosphate coated steel surface of disc 14. The urethane material poured in step 128 will chemically adhere to such an epoxy adhesive to provide a very high strength bond.

In regard to the adhesive for adhering the polyurethane reaction mixture to the wheel, reference may be made to U.S. Pat. No. 2,992,939 which discloses a suitable adhesive comprising a mixture of a resinous copolymer of from 50 percent to 80 percent by weight of styrene and from 50 percent to 20 percent by weight of acrylonitrile with a polyisocyanate, more fully described in U.S. Pat. No. 2,683,730 and which may be described as mixtures defined by the formula $OCN-R-(CY_2-R'-NCO)_n$ in which R and R' are arylene radicals, Y is selected from the group consisting of hydrogen, alkyl and aryl radicals, $n$ is a whole number, and the $-(CY_2-R'-NCO)$ groups in excess of 1 are attached to an R' radical, the mixtures containing at most 40 percent of the diisocyanate. The aforementioned CONAP 1146-C adhesive is an adhesive of this type.

Also, epoxies in combination with diamines per se or the diamines in the polyurethane reaction mixture may be utilized as adhesives. Generally, the epoxy compositions, such as the reaction products of epochlorohydrin and bisphenol A, such as Epon 828, are used with a diamine or in conjunction with a cement of the polyolefin rubber type such as polystyrene butadiene or polybutadiene acrylonitrile and a diamine.

It has been found that the step of curing the overlay in an oven after pouring the same, indicated in block 130, may be eliminated by placing the wheel and disc subassembly while still hot from step 120, i.e., at a temperature of about 180° F., in mold 36 (step 124) and then pouring the urethane in step 128 while the steel parts of the wheel are substantially at this temperature. This also enables the post-cure oven heating step 144 to be eliminated. Normally, in step 144 the composite wheel is heated to about 250° F. to eliminate any entrained air which might later bubble through the urethane paint applied in the step 160 when the same is being cured in a bake oven in step 162. Elimination of step 144 also eliminates the need for quenching step 146 wherein the composite wheel is cooled to permit handling in the subsequent steps 148 and 150.

It is to be understood that the density and surface hardness of overlay 16 may vary within relatively wide limits depending upon the aesthetic and/or functional end results desired in the composite wheel construction. For example, in one composite wheel constructed in accordance with the present invention it is desired to simulate a currently popular so-called "sport wheel" of the type having a rolled drop-center rim supported by a sand cast aluminum disc or body, such wheels having been popularized in drag and sports car racing. To achieve this in accordance with the present invention, an overlay 16 is cast against a conventional wheel as illustrated in FIG. 2 with the overlay positioned vertically beneath the wheel. The polyurethane reaction mixture of Example 1 is used with a very small part of retained water, approximately one-tenth of one percent, which is sufficient to produce a slight blowing action during the reaction, i.e., generation of carbon dioxide gas bubbles which permeates the urethane material when cured to thereby reduce the density to about 53 or 54 pounds per cubic foot as compared to a density of 70 pounds per cubic foot of non-cellular urethane.

Due to the orientation of the overlay beneath the wheel disc, the outboard face of the overlay is adjacent the lowermost surface of the mold cavity. Hence the gas bubbles tend to rise and migrate toward the inboard portion of the overlay closest to the wheel disc 14 while the reaction mixture is still liquid. This migration results in a variation in density axially of the overlay so that a relatively dense skin is produced adjacent the outboard face of the overlay, the urethane becoming less dense and more cellular axially towards disc 14. Any molding defects, such as large pockets or bubbles, will tend to occur adjacent or at the interface of overlay 16 and disc 14 where, generally speaking, such defects are less critical and do not spoil the end product, as compared to casting overlay 16 with mold part 38 superimposed on the rim and disc subassembly which tends to locate such casting defects at the outboard face of the overlay.

The higher density skin at the outboard face of overlay 16 is advantageous from the standpoint of receiving a painted finish, or receiving a decorative surface texture or finish cast into the outboard surface of the overlay, as well as achieving a smooth relatively hard surface less susceptible to damage in use. Preferably the outboard face of overlay 16 should have a Shore A hardness in the range of at least 85 to 100, with the preferred materal having a Shore A the hardness of about 90 to 95. Materials having a lower Shore A hardness of 30 to 60 could be used, but difficulty may be experienced in some applications with such materials flexing or distorting from impacts received as when curbing the wheel. Accordingly, the polyurethanes or elastomers employed in overlay 16 should have an outboard surface hardness at least equivalent to that of a pneumatic tire to be used with the wheel, such being usually a Shore A hardness of at least 60 and preferably about 70.

When using a slight blowing urethane material to provide a micro-cellular overlay 16, a wide range of densities may be obtained ranging downwardly to about 30 pounds per cubic foot. Non-rigid urethane elastomer materials are available having much lower densities than 30 pounds, ranging down into the 20 or 10 pound range, but the skins on an overlay cast from such material tend to be relatively porous, and hence difficulty is experienced in obtaining a satisfactory mirror-smooth surface to be painted, if such is the effect desired. However, when simulating a sand cast aluminum surface of the aforementioned sport wheel, a less dense and more cellular urethane overlay is desirable inasmuch as painting the same with a conventional metallic aluminum paint will result in the paint solvents partially etching the surface and opening up the pores. This in turn gives a surface appearance substantially identical to that of sand cast aluminum. Similarly, if a wood grain effect is to be imparted to the outboard face of the overlay, low density highly cellular urethane overlays are advantageous since they lend themselves to etching finish treatments used in bringing out simulated wood grain effects.

On the other hand, the higher density materials are preferred from the standpoint of structural strength needed to maintain the shape of the overlay, particularly where relatively complicated contours are employed in the overlay, such as protruding air scoops and the like which must retain their physical shape and orientation even when subjected to the distortional effects of road shocks and bump impacts, curb scuffing and centrifugal forces exerted at high wheel speeds. For this reason, densities on the order of 50 pounds or more per cubic foot are generally preferred in constructing the composite decorative wheel constructions of the present invention. A density of 53 to 54 pounds per cubic foot has been found to be highly satisfactory in producing the aforementioned sport wheel having an outboard surface painted with metallic aluminum paint and simulating sand cast aluminum, but with relatively deep axially extending air scoops requiring considerable structural strength in the overlay.

From the foregoing description it will now be understood that the composite wheel construction of the present invention provides several advantages. Hitherto it has been customary to "dress up" a non-decorative conventional steel wheel by removably affixing a decorative wheel cover to the outboard face of the wheel. However, with the decorative wheel construction of the present invention no additional wheel cover is needed, and at the same time a safer product is obtained because the non-metallic overlay is permanently affixed to the wheel in a very secure manner. Hence there is no accidental detachment problem, a hazard which is associated with conventional removable wheel covers which can and do on occasion fly off a wheel of a passenger vehicle while travelling at high speed. The mechanical fasteners, clips, etc. associated with wheel covers are also eliminated. Affixing the elastomer overlay to the wheel disc with a permanent adhesive bond during manufacture of the wheel rather than as a later add-on insures better control of this safety factor. The casting or molding in place of overlay 16 also insures that the mass of the decorative overlay is positioned in a concentric and arcuate relationship to the wheel disc and rim so that the resulting composite wheel is well balanced, dynamically and statically. Nevertheless, it is to be understood that in its broader aspect the present invention contemplates a composite wheel construction in which the elastomeric decorative overlay is cast or molded as a separate entity from the rim and disc of the wheel, and then subsequently permanently attached to the outboard face of the wheel rim and/or disc by a suitable adhesive. However, this alternative construction requires additional assembly and fixture apparatus in order to achieve the necesasry concentricity and balance tolerances, and hence the cast-in-place method described previously is preferred because less production equipment is required and the separate attachment step is eliminated. In either embodiment, however, overlay 16 preferably constitutes a "homogeneous mass of an elastomer material," which term is intended to include such a body having its outboard face painted or otherwise coated, having filler extenders and/or metallic or other foreign material inserts embedded in its outer surface and/or having a density which varies due to the addition of fillers and/or due to variations in cell size and distribution. Despite these variations, "homogeneous" as used herein means the entire overlay (excluding subsequent surface treatments) is essentially the same material throughout and/or is formed in one operation, preferably casting or molding.

Another advantage of the composite decorative wheel of the present invention is the flexibility it provides to both the wheel designer and to the wheel manufacturer. The designer can exercise wider latitude in his choice of shapes and contours since he is no longer inhibited by the limitations involved in deep drawing of the metal of the wheel disc in order to achieve an aesthetically pleasing appearance. The wheel manufacturer can economically produce a standard steel wheel rim and disc subassembly for a whole series of different wheel designs, thereby greatly reducing production costs because of this standardization. The extensive capital investment required in drawing equipment is greatly reduced, and design changes can be quickly accomplished with only a minimum of re-tooling of the comparatively inexpensive molding equipment required to cast the non-metallic decorative overlay against the wheel.

Due to the elastomeric nature of overlay 16, it provides a further safety feature in that it serves as a cushion which offers protection to the main structural steel components of the wheel in the event of a side impact, as when the wheel strikes a curb, thereby reducing the exposure of these components to stress risers and cracks. It has also been found that the urethane elastomer will flow during pouring and curing into the minute clearance spaces between the rim and disc, between the circumferentially spaced spot or arc welds joining the same, to thereby provide a thin resilient cushion between these steel parts of the wheel which is believed to reduce wheel noise and transmission of noise through the wheel. It is to be understood that the overlay 16 may also cover a portion or all of the outboard face of the rim 12, and be adherently secured thereto in the same manner as it is to the disc. Such additional coverage helps further reduce any transmission of noise through the wheel. In some instances, overlay 16 may overlie and be secured to rim 12, leaving the disc 14 or a portion thereof uncovered and exposed to view.

The aforementioned filler material may be conventional polyurethane fillers such as clay, calcium carbonate, barium sulfate, polyvinyl chloride, etc. The filler may constitute up to about 50 parts of filler per 100 parts of polyurethane by weight. The primary purpose of using a filler is as an extender to reduce the cost of the materials in overlay 16, but fillers such as the aforementioned materials also provide some improvement in physical characteristics such as increasing the tensile strength of overlay 16 and providing an outboard surface more compatible with certain types of paints. The addition of the aforementioned fillers increases the density of the overlay composition, one example being an overlay 16 constructed of the materials set forth in Example 1 and in addition containing 40 parts of a clay filler per 100 parts of the urethane mixture by weight, resulting in a density of about 89 pounds per cubic foot.

Figure 9:
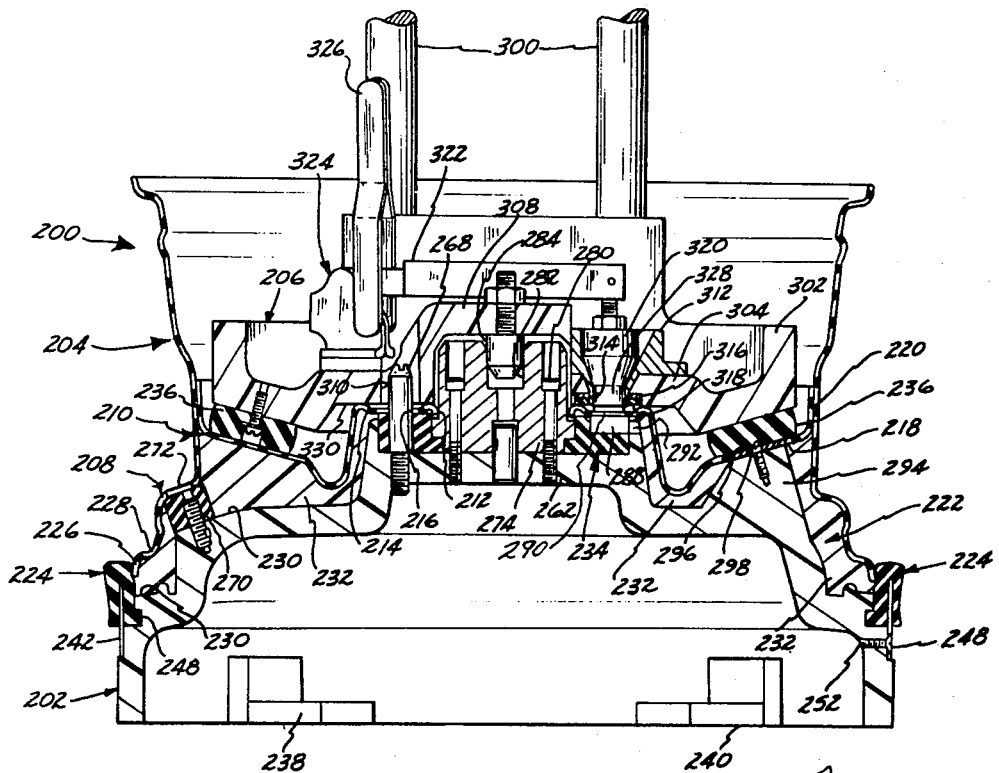
FIG. 9 is a vertical sectional view taken on the line 9—9 of FIG. 7.

FIGS. 7-11 illustrate another embodiment of a molding apparatus or mold 200 constucted in accordance with the apparatus and method concepts of the present invention and particularly adapted for making a styled composite wheel pursuant to the previously described method. However, the wheel made in mold 200 differs from wheel 10 in that the ornamental plastic portion of the composite wheel covers the outboard surface of the rim as well as the disc of the wheel. Like the previously described mold apparatus 36 illustrated in FIG. 2, molding apparatus 200, as best seen in FIG. 9, preferably comprises three main components; namely, a lower mold part 202, a metal vehicle wheel subassembly 204 which is operable as is as a street wheel on an automobile, truck, trailer or the like, and an upper half 206 which serves as a back-up clamp or support for wheel 204 when it is placed on mold part 202. Wheel subassembly 204, like wheel subassembly 12-14 of the previous embodiment, comprises a conventional drop center steel rim 208 which may be roll-formed on conventional wheel manufacturing equipment and secured by welding and/or rivets with conventional equipment to a stamped steel central disc or body 210 to provide a metal wheel for demountably receiving a tubeless pneumatic tire, and which is adapted for demountable attachment to the usual wheel hub, brake drum or the like of a vehicle. Disc 210 thus has a central circular aperture 212 for receiving the vehicle wheel hub, spindle, axle or the like therethrough. A concentric annular "bolt circle" portion 214 in disc 210 encircles aperture 212 and has a plurality of bolt holes 216 therethrough, usually five holes equally spaced, for receiving wheel mounting bolts, studs or other fasteners customarily employed to demountably secure the wheel to the vehicle. Disc 210 also has a series of cutouts 218 arranged in a circular row adjacent but spaced radially inwardly from a marginal axially and circumferentially extending flange 220 of the disc. Cutouts 218 provide a series of air vent openings to permit air circulation axially through the wheel for cooling of the brakes which are normally disposed closely adjacent the inboard side of the wheel when the wheel is mounted on a vehicle.

Wheel subassembly 204, when constructed for present-day passenger vehicle, light trailer or light truck use, is preferably constructed like wheel subassembly 12-14 from a single layer of cold-worked steel. Thus, rim 208 customarily is formed from a flat sheet blank which is rolled into a hoop, butt welded and then rolled to form the drop center configuration shown in FIG. 9. Disc 210 is usually cold drawn in stamping equipment from a disc of sheet steel in a multiple draw operation and then force-fit into place so that flange 220 engages the center well of rim 208. The rim and disc may then be secured to one another by a series of circumferentially spaced spot welds formed radially through flange 220 and the drop center well of the rim and/or by a circumferentially extending arc weld around the inboard edge of flange 220. Once so assembled, wheel subassembly 204 may be used as a nonornamental "plain Jane" wheel for low cost applications where styling is not important or feasible. However, in accordance with the present invention, these same wheel subassemblies 12-14 or 204 also may be used in the making of, and as a part of, mold apparatus 36 and 200 respectively of the invention. This mold apparatus is then used to construct a composite metal and plastic wheel, pursuant to the method previously described in conjunction with FIGS. 1–6, which has an ornamental plastic overlay 222 permanently affixed to the outboard rim and disc surfaces of the wheel so that when viewed from the outboard side the composite wheel has a pleasing styled appearance. The method of making a mold for constructing such a composite wheel also follows that described previously; i.e., a metal wheel disc and rim subassembly 204 is constructed and completed to the point where it would be an operable street wheel if a tire were mounted on the rim. A lower mold part 202 is also provided having an annular lip in the form of a resilient seal 224 adapted to seat against an annular portion of the outboard face of subassembly 204 radially outwardly of the center of the disc. In the embodiment of FIGS. 7–11 this annular seat on the wheel comprises the radially outermost surface of the generally axially extending portion 226 of the tire bead seat retaining flange 228 of rim 208. The lower mold part 202 has a surface 230 on its upper side radially inwardly of seal 224 adapted to define, with the outboard face of the wheel subassembly 204, a mold cavity in which the decorative plastic overlay is cast. This cavity comprises the portion shown in FIG. 9 filled with urethane material 232 between surface 230 and the outboard face of wheel subassembly 204. Thus, surface 230 and the cavity surface of seal 224 are suitably contoured to provide an ornamental configuration for the outboard face of the composite wheel 204–232.

To assemble mold 200, wheel subassembly 204 is placed against part 202 as shown in FIG. 9 with flange 226 resting on or in light contact with seal 224. This also lightly seats the bolt circle portion 214 of disc 210 against an annular inner seal 234 (FIGS. 8, 9 and 11) mounted on mold part 202 and adapted to seal the mold cavity around its inner perimeter in the fully seated condition of wheel subassembly 204 on mold part 202. Mold parts 202 and 204 are preferably oriented with their axes upright and with mold part 202 beneath part 204, preferably during assembly of the mold but at least prior to pouring or otherwise filling the mold cavity with material 232, so that wheel subassembly 204 serves as a lid for the mold cavity. After subassembly 204 and part 202 have been engaged and oriented as indicated above, mold 200 is completed and readied for filling by urging the upper mold part 206 against the wheel subassembly 204 as shown in FIG. 9. Upper mold part 206 has at least one arcuate or annular portion such as the resilient annular pad 236 (FIG. 9) having a configuration on its underside adapted to seat against the inboard face of subassembly 204 to thereby force the same further toward part 202 and then retain parts 202 and 204 in sealing engagement.

Thus, it will be seen that, as in the previous embodiment of FIGS. 1–6, molding apparatus 200 utilizes the metal wheel subassembly 204 to form one of the juxtaposed walls of the mold cavity, and that wheel 204 is interposed between the lower mold part 202 defining the other major wall of the cavity and an upper back-up clamp 206.

The lower mold part 202 of molding apparatus 200 of FIGS. 7–11 is preferably constructed of fiber glass or the like and has a hollow half shell-like configuration with suitable mounting brackets 238 and 240 (FIG. 9) and 241 (FIG. 7) secured to its inner periphery for securing mold 200 to a conveyor support or the like. The outer annular sealing lip 224 of mold part 202 is preferably a two-piece detachable ring made up of a split cylindrical metal band 242 received with a press fit in a groove 243 in a resilient elastomeric seal ring 244 which is thereby mounted on the upper edge of band 242. Ring 244 is a complete, unsplit annulus and may be cast of silicone rubber such as that sold under the trademark SILASTIC by General Electric Company, otherwise known as GE630 silicone rubber material. Ring 244 has a rib 246 of rectangular cross section protuding radially inwardly from its lower edge which is adapted to seat in a complementary external groove 248 in mold part 202 (FIG. 9). Seal 224 is installed on part 202 by stretching ring 244, thereby partially opening band 242, so that seal 224 can be slipped around mold part 202 until rib 246 is registered with groove 248 whereupon the resiliency of ring 244 will compress band 242 to its abutted condition. Then a plurality of mounting screws 248 are inserted through holes 250 in band 242 and threaded into tapped holes 252 in part 202 to securely fasten seal 224 on mold part 202.

The inner periphery of seal ring 244 has a cylindrical surface 254 extending between rib 246 and a bevel surface 256 which is inclined about 30° outwardly from the axis of part 202 and terminates at an intersection with a radial or horizontal upper surface 258 of ring 244. In the mounted condition of seal 224, surface 254 projects upwardly beyond the outermost margin 230' of mold surface 230 (FIG. 9). The diameter of surface 254 prior to seating of wheel 204 thereon is slightly smaller than the maximum outside diameter of flange portion 226 of rim 208 so that, for example, in the case of a 15-inch diameter passenger vehicle wheel 204, portion 226 has an interference fit with surface 254 on the order of about 0.250 inch diametrically. However, the upper edge 257 of bevel 256 has a diameter larger than the outside diameter of portion 226 of the wheel subassembly 204. Thus, when subassembly 204 is initially loosely seated on mold part 202, the outer corner of portion 226 will rest on bevel 256. Then when upper clamp 206 is brought downwardly into contact with the inboard face of disc 210 and thereafter forced axially downwardly to urge wheel subassembly 204 axially downwardly, the outer edge of portion 226 will be forced to slide downwardly first along bevel 256 and then along surface 254. Due to the interference fit, ring 244 will yield and flex outwardly and thereby provide a tight liquid sealing engagement at the outer edge of the mold cavity. Such resilient deformation of ring 244 is best seen by comparing FIGS. 10 and 9.

Figure 11:
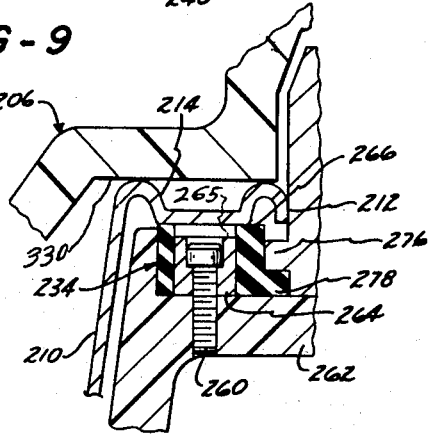
FIG. 11 is a fragmentary vertical sectional view on the line 11—11 of FIG. 7.
Figure 10:
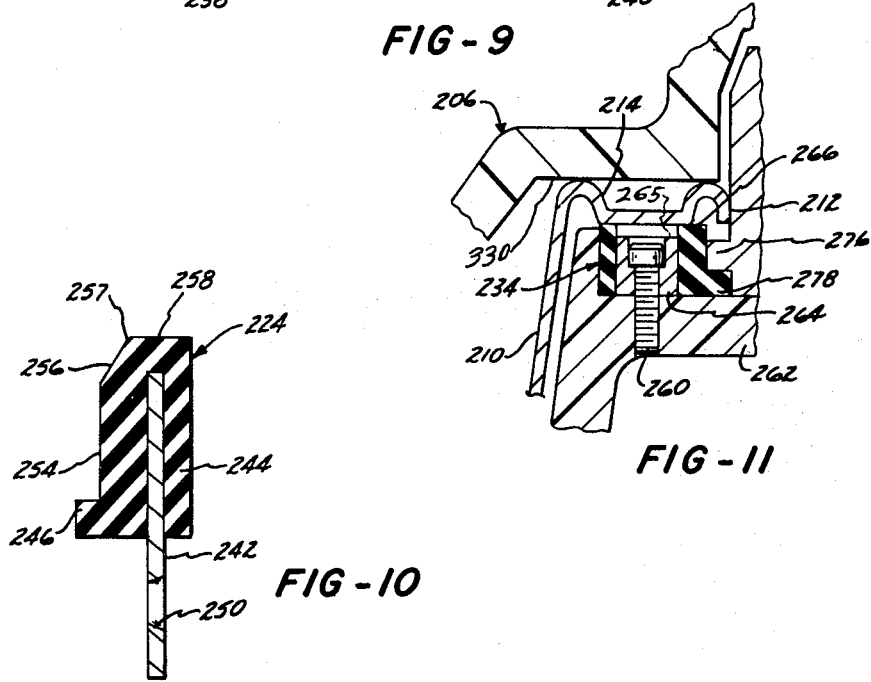
FIG. 10 is an enlarged vertical sectional view illustrating an annular outer seal of the mold apparatus of FIG. 9 but enlarged thereover, the elastomeric portion of the seal being shown in its released, free-state condition.

Another feature of mold 200 is the inner annular seal 234 which is removably mounted by recessed studs 260 (FIG. 11) which screw into tapped holes in a horizontal annular platform portion 262 of mold part 202. Preferably seal 234 is also constructed of the aforementioned silicone rubber material and has cast-in steel bushings 264 which are counterbored to individually receive studs 260 as shown in FIG. 11. The upper surface 266 of seal 234 is generally flat and extends radially of the mold so as to form a seating and sealing engagement with the outboard surface of the bolt circle portion 214 of disc 210, as best seen in FIG. 11. Shim washers (not shown) are inserted under bushings 264 to individually adjust the height of the upper surface 265 of each bushing so that these surfaces 265 are at the proper elevation relative to the upper surface 266 of seal 234 to serve as nonyielding bottoming stops when engaged by bolt circle portion 214 during final closure of mold 200. A locating pin 268 (FIGS. 7 and 9) is threadably secured in mold portion 262 and extends upright through a hole 269 (FIG. 8) in seal 234 and thence coaxially through the registered one of the five bolt holes 216 in disc portion 214. Pin 268 serves to properly angularly locate wheel subassembly 204 relative to mold part 202. When these parts are thus located a resilient silicone rubber core 270 (FIG. 9) mounted on part 202 is properly aligned for engagement with the margin of a hole 272 provided in rim 208 to thereby provide a hole in body 222 for receiving the usual tire valve stem which is later mounted in rim hole 272.

Seal 234 is securely clamped against portion 262 by a steel centering plug 274 which has an external rib 276 (FIG. 11) overlying an internal rib 278 of seal 234. Plug 274 is secured by studs 280 which thread into tapped holes in portion 262. Plug 274 is dimensioned to pass through the central aperture 212 of disc 210 with a close clearance fit and has a central aperture 282 with a chamfered entrance adapted to receive a chamfered pilot plug 284 which is secured centrally to and projects downwardly from the underside of clamp 206. Seal 234 also has a recess 288 formed in the upper surface thereof which is open at the outer surface of the seal to serve as a sprue for directing the liquid urethane reaction mixture into the mold cavity during pouring of the mold. Sprue 288 thus registers with a pour opening 290 (FIG. 9) provided in disc portion 214 between a pair of adjacent bolt holes 216 therein, and the pour passageway is completed by a notch 292 in mold part 202 which registers with sprue 288.

Due to the particular aesthetic design chosen in this embodiment for the ornamental body 222, lower mold part 202 has a series of upwardly projecting pedestal portions 294 with stainless steel end plates 296 secured thereto by filister head screws 298. Each pedestal 294 is located to register with an associated vent opening 218 in disc 210 to thereby core a scoop-like frustoconical opening 299 in the overlay body 222 which communicates with the associated vent 218 in the finished wheel. The arrangement and locations of openings 299 in body 222 are indicated in part by the phantom representation thereof in FIG. 7. When disc 210 is fully seated on the lower mold part 202 as shown in FIG. 9, each wear plate 296 projects through its associated opening 218 so that its upper surface is flush with the inboard surface of disc 210 defining the margin of opening 218. Thus, pad 236 will resiliently engage plate 296 as well as the inboard surface of disc 210 around opening 218 so that the liquid urethane material cannot escape from the mold cavity. However, this material can and does enter the large clearance space between pad 296 and the margin of opening 218 so as to completely cover the hole edge surface of the disc.

Upper mold part 206 has four upright posts 300 which extend to a connection with suitable conventional supporting structure (not shown) adapted to raise and lower the upper mold part for opening and closing of mold 200. Part 206 has an outer circular rim portion 302 (FIGS. 7 and 9) and, like mold part 202, preferably is constructed of high temperature-resistant epoxy fiber glass material, cast aluminum or the like. Part 206 also has a generally horizontal body portion 304 with a raised central hollow boss 308 adapted to receive plug 274. An opening 310 is provided in clamp 206 to receive the locating dowel 268 with a large clearance. A steel funnel 312 is secured on the upper surface of clamp 206 and has a neck 314 which extends downwardly through a washer 316 and a gasket 318. Gasket 318 is adapted to engage disc portion 214 so as to encircle pour opening 290 to prevent escape of liquid in the closed condition of the mold. A closure plug 320 is supported on the free end of an arm 322 of a commercially available toggle clamp 324, the base of which is mounted on mold part 206. Clamp 324 has a handle 325 which is moved to the left as viewed in FIG. 9 to raise plug 320 out of funnel 312 and then when returned to the position shown in FIG. 9 securely locks plug 320 in the funnel with the nose 328 of the plug inserted in the neck 312 of the funnel.

To assemble and use the above described molding apparatus 200 of FIGS. 7–11, wheel subassembly 204 is first placed on lower mold part 202. This is readily accomplished merely by lowering wheel 204 onto centering plug 214, the wheel being accurately centered and guided by the margin of disc 210 defining its central opening 212 engaging and sliding downwardly along the cylindrical side surface of plug 274. Accurate angular orientation is obtained by rotating wheel subassembly 204 until pour opening 290 is visually aligned above sprue 288, at which point the wheel can be dropped further to allow locating dowel 268 to enter the registered bolt hole 216. This also accurately aligns core 270 with the valve opening 272. Upper mold clamp 206 is then further lowered until pad 236 rests on the inboard surface of disc 210. Upper mold part 206 is then urged downwardly with greater force to cause the flat undersurface 330 (FIGS. 9 and 11) of portion 304 to bear against the inboard surface of disc bolt circle portion 214 and thus force the disc tightly down on seal 234. Seal 234, due to its resilient nature, yields to such force until the outwardly protruding circular portions 215 (FIG. 11) of disc 210 around three of the bolt holes 216 bottom on the upper surfaces of the associated stops 264. With plug 320 raised to its open position, mold 200 can then be filled by inserting a suitable metering nozzle into funnel 312 and then by using either gravity or pressure injection the urethane reaction mixture is caused to flow via pour opening 290 and sprue passageway 288–292 into the sealed mold cavity. The urethane material cannot escape via openings 218 due to the sealed engagement of pad 236 against the inboard surface of the disc, and likewise is sealed from escape from the radially outer perimeter of the mold cavity by the sealing engagement of disc flange 226 with seal 224.

After the urethane has solidified, the above procedure is reversed to open mold 200, whereupon the ornamental plastic overlay 222 has now become a permanent fixture on wheel 204. Mold 200 is thus reconstructed for each pour by supplying another wheel subassembly 204 to complete the mold for pouring.

I claim:

1. A method of making a mold for constructing an ornamental styled wheel for automotive passenger vehicles and the like comprising:
    1. providing a metal wheel disc and a metal tire-receiving rim subassembly operable as a street wheel when a tire is mounted on said rim;
    2. providing a lower mold part having an annular lip adapted to seat against an annular portion of the outboard face of said subassembly radially outwardly of the center of the disc, the mold part having a surface contoured to provide an ornamental configuration for the outboard face of said wheel and adapted to define with at least part of the outboard face of said subassembly a mold cavity axially adjacent the outboard face thereof;

3. placing said wheel subassembly against said mold part with said annular portion of the outboard face of said subassembly in sealing engagement with the annular lip portion of said mold part;

4. orienting said subassembly and mold part with their axes upright and said mold part beneath said subassembly whereby said subassembly serves as the lid for said mold cavity;

5. providing an upper mold part having at least one arcuate portion with a configuration adapted to seat against the inboard face of said disc and rim subassembly;

6. and urging said upper mold part against said disc after said step (3) to thereby retain said subassembly in said sealing engagement with said lower mold part.

2. The method as set forth in claim 1 wherein said disc has a center hole and said lower mold part is provided with a central locating core projecting into said cavity coaxially with said disc center hole, and further including the step of registering a central portion of said upper mold part with the protruding end of said core to thereby form a core wall in said cavity radially inwardly of said annular lip portion of said mold part.

3. The method as set forth in claim 1 wherein said disc is provided with a plurality of holes adapted to receive wheel mounting fasteners therethrough and said lower mold part is provided with a plurality of locating pins protruding therefrom parallel to the axis of the wheel disc and rim subassembly when mounted on said mold, said pins being adapted to register with said disc holes, and further including the step of circumferentially locating said disc with said holes thereof in registry with said pins of said lower mold part as said disc is placed against said lower mold part in step (3) of claim 1 whereby said pins protrude through said disc holes when said disc and rim subassembly is fully seated in said sealing engagement on said lower mold part.

4. The method as set forth in claim 1 wherein said disc is provided with a plurality of vent openings arranged in a circular row radially intermediate said rim and the central portion of said disc and said lower mold part is provided with a plurality of bosses protruding parallel to the axis of the disc and rim subassembly when placed on said lower mold part and adapted to register with said vent openings, and further including the step of seating said disc on said lower mold part with said bosses registering with said vent openings as said disc is placed against said lower mold part in step (3) of claim 1 so that said bosses protrude into said vent openings when said disc and rim subassembly are fully seated in said sealing engagement on said lower mold part.

5. The method as set forth in claim 1 wherein said step (1) of claim 1 comprises securing said rim to said disc by circumferentially spaced welds between the outer periphery of said disc and the inner periphery of said rim such that slight gaps are provided therebetween intermediate said welds to thereby provide vent openings to said cavity in the closed condition thereof for receiving liquid material when the cavity is being filled with such material in the pouring of said mold.

* * * * *